Dec. 23, 1941.  W. W. POSEY  2,267,168
SHORE PIPE
Filed Sept. 7, 1940   2 Sheets-Sheet 1

INVENTOR.
WALTER W. POSEY
BY
ATTORNEYS.

Dec. 23, 1941.     W. W. POSEY     2,267,168
SHORE PIPE
Filed Sept. 7, 1940     2 Sheets-Sheet 2

INVENTOR.
WALTER W. POSEY
BY *James M. Heitman*
ATTORNEYS.

Patented Dec. 23, 1941

2,267,168

UNITED STATES PATENT OFFICE 2,267,168

SHORE PIPE

Walter W. Posey, East Lampeter Township, Lancaster County, Pa.

Application September 7, 1940, Serial No. 355,787

6 Claims. (Cl. 285—137)

The object of this invention is to provide a shore pipe which is rugged in construction, easy to manufacture, store, and transport.

A further object of this invention is to fabricate a shore pipe which is easy to assemble in a rigid condition at the point of dredging, and is capable of being rolled or moved easily from one point to another.

A still further object of this invention is to provide a band or ring on shore pipe which ring has one of its sides beveled or cut on a taper, provided with a groove or a projection, or formed with some other configuration so that a clamping or engaging element will be enabled to seat in this band and thus to hold securely one section of shore pipe to an adjacent section without danger of the joint leaking.

Other and further objects will be apparent from a reading of the following specifications:

Figure 1:
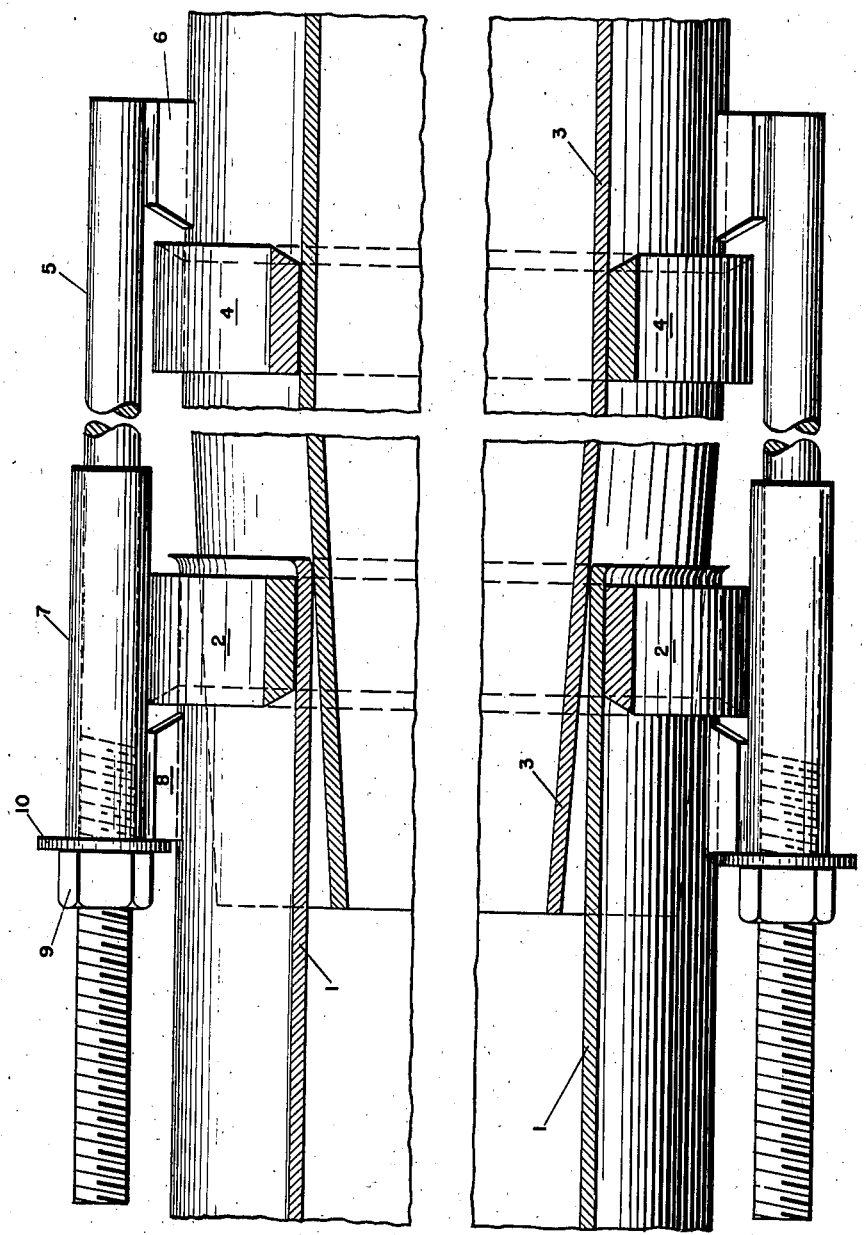
Fig. 1 is a view, in section and elevation, showing two sections of shore pipe just prior to being clamped together.

In dredging operations for river work there is generally what is known as pontoon pipe, supported on pontoons, which carries the water, mud, grit, gravel, and stones from the dredging machine to the shore. At the shore the pontoon pipe is connected to shore or land pipe which carries the material from the pontoon pipe to the place where it is to be deposited.

Pontoon pipe is heavy, but, on the contrary, shore pipe is relatively light in weight. The reason for the relative lightness in weight of shore pipe as compared with pontoon pipe is that in many operations the shore pipe must be moved frequently from one point to another. The advantage for the relative lightness is its mobility, and the disadvantage is that the pipe is relatively thin and hence subject to being dented when struck by other objects.

Shore pipe ranges from approximately 8" in diameter to 36" in diameter and from 400 lbs. to 2,000 lbs. per section. The length of the sections varies generally from 12' to 20' long, although the standard lengths are 16'3" and 16'8¼".

At one end of each section of shore pipe is generally provided a long taper which fits into the adjacent end of the next section. The necessity for the taper is so that the pipe can be easily fitted together securely, and can be laid in a curve. This is unusual in pipe construction. The usual practice after a certain quantity of material has been deposited at the end of the pipe line is to extend the pipe by adding other sections. The additional sections are laid over the fill. After this operation has been performed many times, it may be necessary to swing the entire pipe line into a long arc throughout its length, or even to detach the line completely, roll it to a new location, and reconnect the line.

Naturally, while a section of pipe is being added or while the entire line is being moved the dredger cannot operate. The rental for dredgers is exceedingly high, i. e., from $80,000 to $130,000 a month, so that any improvement which will speed, even though slightly, the extension, assembly or disassembly of shore line would be of great value in reducing the total cost of the dredging operation.

Prior to applicant's invention there were in common use two types of shore pipe which utilized crude methods for joining the various sections. Both of these methods of fastening shore pipes were subject to the same disadvantages which are set forth below. The simpler of the two types comprised, in addition to the strengthening band, four upwardly and inwardly extending hooks welded onto the section, two on each end of the section, and positioned inwardly of the strengthening band. Adjacent sections of pipe were connected together by wrapping a wire around the adjacent hooks on the contiguous ends of the pipe. The joint was then tightened, more or less, by means of a bar inserted through the wire and the slack taken up.

The other type of shore pipe and method in common use before applicant's invention consisted of four large U-shaped handle elements welded at the open end of the U to the section. The handles on adjacent ends of the sections were secured together by wire, similar to the method employed in connection with the open ended hook, or the one end of the handle was provided with a slot into which was fitted a chain or key and keeper and the pipes drawn together or tightened by means of a rod or bar operating on the chain to draw it up and tighten it.

Naturally these two methods were crude and the pressure and, hence, the efficiency of the dredger was much reduced by reason of poor connections and resulting leakage at the joints.

It was in an effort to overcome the foregoing objections and disadvantages that applicant invented his present device.

Applicant desires to claim any and all advantages which are inherent in his device. It will be understood that the invention is susceptible of embodiment in various forms, some of which are illustrated in the accompanying drawings, and that the structural details herein set forth may be varied to suit particular purposes without departing from the spirit of the invention. Several types of configurations have been shown on the clamping ring and the clamping lugs. Applicant does not desire to be limited to any particular type of clamping rings or clamping bars. The invention may be thoroughly understood by referring to the drawing. However, it is not intended that the invention should be limited by the drawings or any description, but to be limited only by the broadest patentable scope of my invention.

Fig. 1 shows the female end of pipe section on which a strengthening and clamping band or ring 2 is secured. The male end of section 3 is positioned within the female end of section 1. Section 3, likewise, has secured on it a strengthening and clamping band 4. Clamping bands 2 and 4 have their inner side beveled, tapered or undercut for the purpose to be later described. The bands are preferably welded on the sections for a particular method of manufacture although any suitable means, such as, riveting, shrinking, etc., may be employed.

Any type of clamping means may be used to engage the pocket, socket or groove formed by the undercut side or edge of the clamping band and thus hold the sections tightly together. However, applicant has invented one particular type of securing means or securing bar which is particularly effective in combination with the undercut band. It comprises a rod 5 which has welded to one end a clamping lug 6. The other end of the rod is threaded. Over the threaded end of the rod 5 is placed a sleeve 7 to which a clamping lug 8 is welded. A nut 9 and preferably a washer 10 retain the sleeve 7 on the rod 5 and serve to tighten the joint between the two sections. As in the case of the bands, the lugs may be secured to their supporting pieces by any appropriate means.

Figure 2:
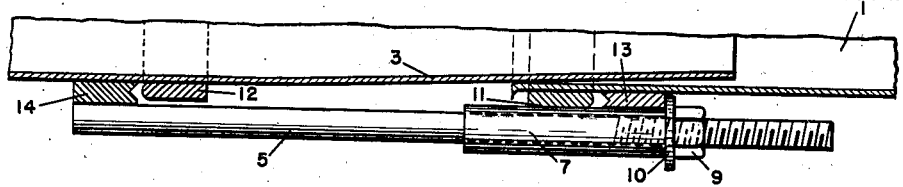
Fig. 2 is a sectional view showing a portion of two sections of shore pipe in which the band and the clamping lugs have a modified configuration at their point of contact.

Fig. 2 shows a section of shore pipe on which the inner sides of the clamping bands 11 and 12 are curved or of circular formation, and the corresponding sides of the clamping lugs 13 and 14 are V-shaped or grooved formation.

Figure 3:
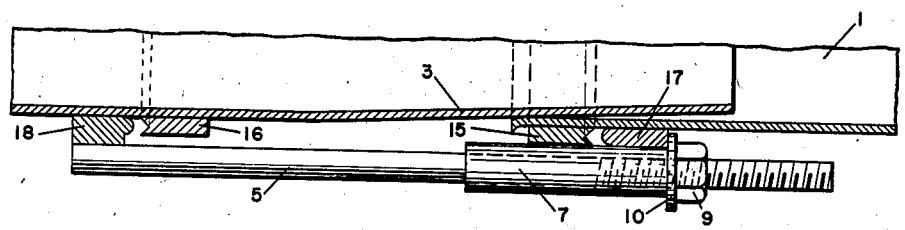
Fig. 3 is a sectional view showing a further modified form of the band and the clamping lug at their point of contact.
Figure 4:
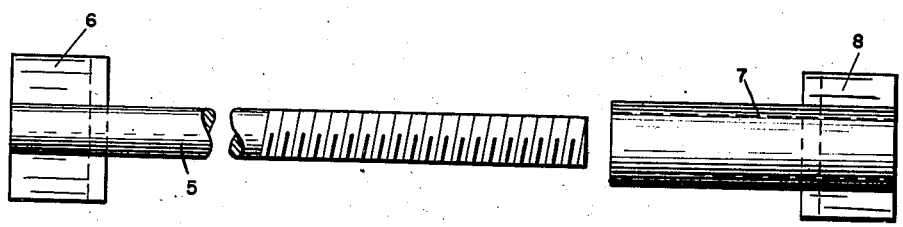
Fig. 4 is an enlarged top view of the clamping element in a disassembled or exploded condition.
Figure 5:
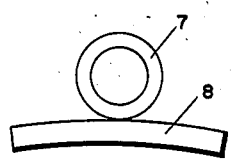
Fig. 5 is an end view of the sleeve and its attached clamping lug.

Fig. 3 is similar to Fig. 2 with the exception that the grooved formation is on the strengthening or clamping bands 15 and 16 while the arclike formation is formed on clamping lugs 17 and 18.

Applicant has shown a band which is undercut or has a projecting part, and a clamping lug which is of such configuration that the lug will contact securely the band and eliminate any possibility of slipping off. However, if desired, both the band and the contacting lug could be rectangular and not be provided with the head and socket arrangement. Also the band and/or lug could be provided with serrations, corrugations or other roughened surface or provided with rubber or other non-slipping surface.

In operation applicant contemplates the use of two clamping bars for each joint. One may be sufficient in certain instances, but sometimes three or more may be desirable in order to secure a tight leakproof joint. Particularly where the arc is more or less sharp it may be necessary to use more than two clamping elements in order that the joint will not work loose.

From a reading of the foregoing, many advantages for applicant's pipe and clamp are apparent over present day pipe used for dredge work. Chief among these advantages are the following:

In manufacturing, the necessity of welding the hooks and handles are eliminated; thereby producing a savings in material and in labor. The pipe is normally fitted with a band in order to strengthen it, and applicant uses the band in its present form or modifies it so that it can be used as a clamping band.

In storage and in loading on cars and boats, the projecting hooks and handles interfere with nesting or packing. Hooks and handles are frequently bent and broken, particularly when being unloaded from cars and boats. These projections also tend to make dents in adjacent pipes when being transported. Dents in pipes of this nature are particularly bad due to the tendency of sand, gravel and pieces of stone to cut holes in pipe quickly when dented.

In operation, the protruding elements make it difficult to roll the pipe from one location to another. Also the hooks and handles frequently cause injury to workmen while rolling or storing the pipe. And most important, additional sections can be quickly and securely fastened without a long cessation of operation of the dredger and its crew.

What I claim is:

1. In a dredge pipe line formed of sections of pipe, clamping bands secured near each end of said sections, said clamping band having an engaging side on the inner side thereof, a clamping rod, a clamping lug secured to said clamping rod, a sleeve adapted to be positioned on said rod, a clamping lug on said sleeve, and a nut whereby when the nut is turned the clamping lugs will press against the engaging side of said band and form a tight joint between the sections.

2. In a pipe for dredge work comprising sections, one of said sections telescoping into another of said sections so that a curved pipe of varying degrees may be laid, a clamp receiving band near to each end of said sections but spaced therefrom, said bands being undercut on their inner sides, and means to engage said clamp receiving bands and secure said sections together.

3. Shore pipe for hydraulic dredge pipe line comprising a pipe, bands on said pipe, one side of said bands being undercut, a clamping bar, a clamping sleeve, said bar and said sleeve carrying lugs which are undercut, means to cause said last named undercut lugs to engage the undercut side of said bands and thereby form a tight joint in the pipe.

4. In a shore pipe, one section of said pipe formed with a tapered and untapered section so as to be telescoped into an adjacent section of pipe and adapted to be placed in an arc of varying degrees, said pipe sections having bands on each end of said sections, and lug means for engaging said bands and means for drawing said lugs together when engaging said bands.

5. A shore pipe comprising a clamping band fastened near each end of said pipe; the inner side of said bands being beveled in the direction of the near end of said pipe to form a pocket for joining to an adjacent pipe, and a three piece lug clamping means for securing said pipe together, said lug clamping means being undercut to engage in said pocket.

6. In a clamp for pipe having clamping bands near its ends comprising a rod, a projection secured to said rod to engage one of said clamping bands, a sleeve adapted to be placed over said rod, a second projection secured to said sleeve to engage another of said clamping bands, and means for drawing said projections together when engaging said clamping bands.

WALTER W. POSEY.